C. H. CLARK.
FLEXIBLE COUPLING.
APPLICATION FILED JAN. 19, 1914.
1,147,373.
Patented July 20, 1915.
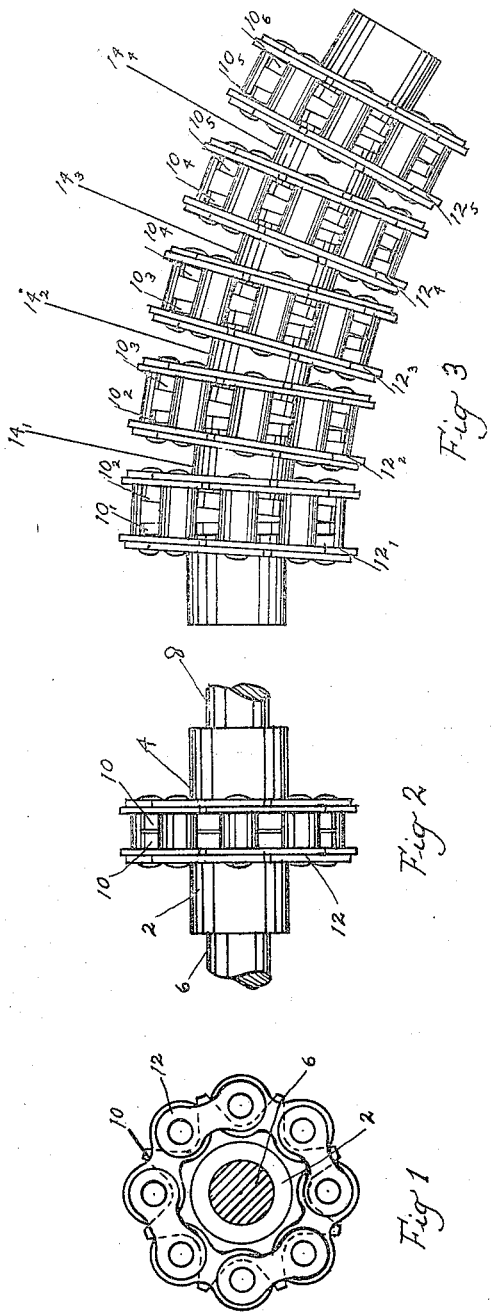
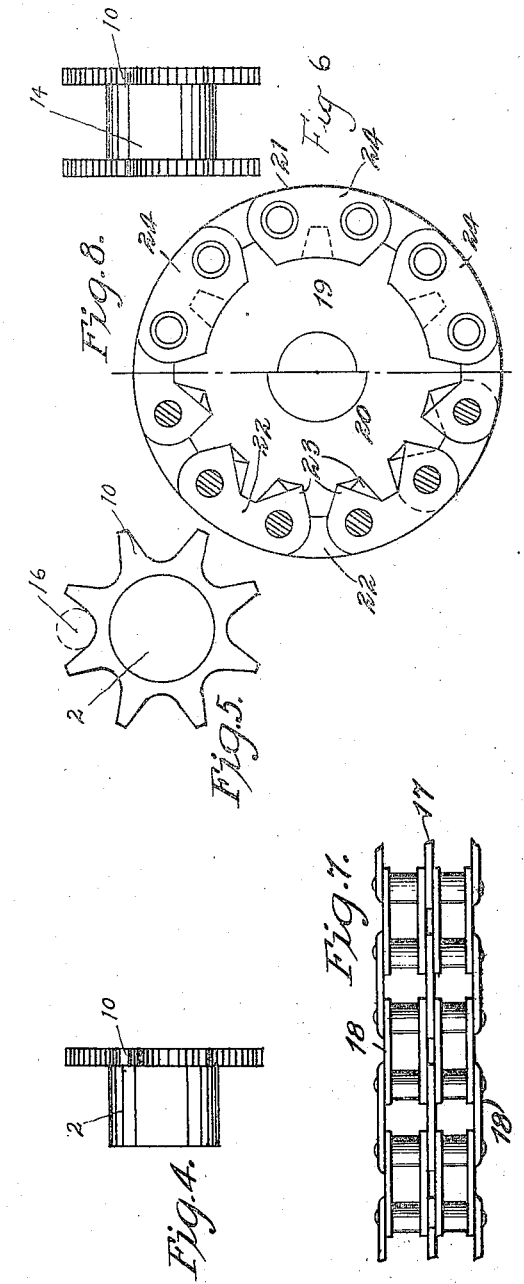
Witnesses:
J. R. Frith
Julia D. Clark
Inventor:
Charles H. Clark.

UNITED STATES PATENT OFFICE.

CHARLES HASKELL CLARK, OF NEW YORK, N. Y., ASSIGNOR TO CLARK FLEXIBLE COUPLING COMPANY, INC., OF NEW YORK, N. Y.

FLEXIBLE COUPLING.

1,147,373.      Specification of Letters Patent.      Patented July 20, 1915.

Application filed January 19, 1914. Serial No. 813,140.

*To all whom it may concern:*

Be it known that I, CHARLES HASKELL CLARK, a citizen of the United States, residing at 422 West One Hundred and Nineteenth street, New York city, State of New York, have invented new and useful Improvements in Flexible Couplings, of which the following is a specification.

This invention relates to couplings for joining two shafts together which will allow great flexibility between them without causing any side strain on the connected members and yet have sufficient strength for the desired purpose.

Another object is to provide a flexible power transmitter.

Another object is to provide a coupling that may readily be disconnected without moving the shafting.

To this end and other ends the invention consists in the novel features of construction and combination of elements hereinafter described.

Figure 1 shows an end view of the coupling. Fig. 2 shows a side view of the coupling. Fig. 3 shows a side view of the flexible power transmitter. Fig. 4 shows a side view of the toothed part attached to the shaft illustrated in Figs. 1, 2 and 3. Fig. 5 shows an end view of Fig. 4. Fig. 6 shows one of the toothed sections of Fig. 3. Fig. 7 shows a "double" sprocket chain, which can be used in my improved coupling. Fig. 8 shows another form of my invention, partly in section.

The coupling shown in Figs. 1 and 2 comprises substantially coaxial sprocket wheels 2 and 4 mounted on shafts 6 and 8, said sprocket wheels having teeth 10 which are flexibly held together by a roller chain 12, the rollers or pivots of which, arranged in a generally axial position relative to the sprockets, are seated in the spaces or recesses between the teeth and bear on the sides of the latter to rotate one sprocket from the other, while the links to which the ends of the rollers or pivots are connected are outside of the sprockets.

The flexible power transmitter shown in Fig. 3 consists of a series of double sprockets 14, 14$^a$, etc., having teeth 10, 10$^2$, etc., held flexibly together by a series of roller chains 12, 12$^2$, etc.

I prefer to use a rigid sprocket, of the type indicated in Figs. 4 and 5, and a "single" chain, as in Fig. 2. In the case of a double chain, illustrated in Fig. 7, the center row or series of links, 17, lie between the two sprockets and the outer links 18 lie outside the sprockets.

In the construction shown in Fig. 8, the numerals 19, 20 designate two spur gears, the gear 17 being nearer to the observer and its left-hand half cut away to show the other gear. The coupling element 21 is what is known as a "silent" chain, composed of links 22 provided at their ends with teeth 23 extending into the recesses between the gear teeth. The outer links 24 on each side of the chain are not toothed but are extended radially inward to overlap the gear teeth and thereby prevent displacement of the chain sidewise.

Fig. 5 shows one of the rollers 16 in its normal position between the teeth 10 when the chain is tight enough to prevent its moving outward; in practice however, it is often desirable to have great flexibility and this is accomplished by simply providing the roller with a limited amount of play in which to adjust itself to the movement of the teeth which do not properly line up.

It is to be understood that the invention is not limited to the devices herein specifically illustrated, but can be embodied in other forms without departure from its proper spirit and scope, as defined by the appended claims.

I claim:—

1. In a coupling, the combination of coaxial disks provided with a group of toothed members thereon, and an element encircling these disks and having a group of members pivoted on longitudinal axes with respect to the axes of said disks and bearing directly on the bearing surfaces of the teeth to drive one disk from the other, the surfaces on one group of said bearing members being extended lineally and longitudinally with respect to the axes of said disks.

2. In a coupling, the combination of coaxial disks having teeth on their peripheries, and a flexible element encircling the disks and provided with axially extending members lying in the spaces between the teeth and bearing on the sides of the teeth to drive one disk from the other.

3. In a coupling, the combination of coaxial disks provided with a group of toothed members thereon, and an element encircling the disk and having a corresponding group of axially extending members pivoted in the sides of said element and bearing directly on the sides of the toothed members, the surfaces on either group of members being extended lineally and longitudinally with respect to the axes of said disks for a distance approximating the maximum separation of the disks from each other.

4. In a coupling, the combination of a pair of co-axial sprockets, and a sprocket chain encircling and engaging both sprockets to drive one from the other.

5. The combination of a pair of substantially co-axial shafts, arranged end to end; two circular series of teeth concentric with the shafts at the adjacent ends thereof and connected therewith, one series to each; and a sprocket chain coöperating with both series of teeth to drive one series and shaft from the other series and shaft.

6. In a coupling, the combination of co-axial sprocket disks provided with a group of toothed members projecting therefrom, and a flexible element encircling these disks and having a group of axially extending cylindrical members bearing on the sides of the toothed members, to drive one sprocket from the other, the bearing surfaces on either group of members being extended longitudinally with respect to the axes of said tooth disks for a distance approximating the maximum separation of the disks from each other.

CHARLES HASKELL CLARK.

Witnesses:
J. R. FRITH,
JULIA D. CLARK.